Patented Feb. 2, 1937

2,069,533

UNITED STATES PATENT OFFICE 2,069,533

PROCESS OF REMOVING WAX AND RESINS FROM SHELLAC

Leon McCulloch, Pittsburgh, Pa., assignor to Westinghouse Electric & Manufacturing Company, East Pittsburgh, Pa., a corporation of Pennsylvania No Drawing. Application February 14, 1934, Serial No. 711,225

4 Claims. (Cl. 87—2)

This invention pertains to hardening shellac, such as used to bond mica flakes for electrical insulation.

An object of this invention is to provide shellac that is hard and possessed of high strength against shearing, or against plastic flow, at somewhat elevated temperatures. Mica sheets comprising such a bond constitute improved insulation in electrical machines as between commutator segments where high stresses are encountered at temperatures above 100° C.

A further object is to provide shellac substantially free from water and reagents that would gradually impair the electrical and mechanical properties, for it has been found that even small amounts of residual impurities promote hydrolysis, dissolution or softening of shellac.

Other objects and advantages of this invention will be apparent with further description of preferred practice of the invention.

This invention is predicated on my discovery that softening or weakening of shellac is due to plasticization that can be overcome by treatment with benzol, or to some extent by other low-boiling hydrocarbons which, like benzol, swell shellac.

In a preferred process that is illustrative, but not restrictive, of this invention, commercial shellac is contacted intimately with benzol for sufficient time to obtain thorough permeation by the benzol. Agitation by means such as a paddle mixer or rotating drum is desirable. Warming facilitates the action of the benzol. Finally the benzol extract is removed, as by decantation or filtration, followed if need be by distillation.

An extension of this process is based on my recognition of the effect of water to prevent polymerization of the shellac during the benzol treatment. The presence of water permits advantageous utilization of heat in this strengthening treatment, with retention of desired thermoplastic qualities in the modified shellac, though heat has been regarded as tending to promote polymerization and to impair the solubility of shellac in various solvents. In practical operation commercial shellac may be agitated with hot benzol and water, then the liquid decanted, and application of the hot liquid repeated. This process is readily made continuous.

As an example illustrating continuous application of liquid according to this invention, a bulk of benzol and water containing commercial shellac is agitated under a reflux condenser, with the vessel equipped for overflowing to an adjacent distillation flask. Though the treating vessel be heated, yet the benzol largely forms an upper layer at the overflow level. The shellac largely floats between the water and the benzol with practically no tendency for emulsification. The benzol extract overflows into the adjacent chamber, and from there the benzol is distilled into the reflux condenser for return to the treating vessel. The treated shellac after removal from the bulk of liquid, is freed from any water by heating, preferably in a current of gas to promote evaporation, but with avoidance of such prolonged heating as would induce polymerization of the shellac.

The present process not only removes wax from commercial shellacs, but also removes other plasticizing substances such as rosin and ether soluble resins which previous processes failed to remove. This invention avoids many difficulties from chemical alteration of the shellac that have followed previous processes in which alkaline reagents were used. It also avoids impairment from liquids that are not removable without undue heating and alteration of the shellac or which as residual liquids tend to soften and weaken shellac.

In this description, commercial shellac has been mentioned for illustration, but it will be evident that many of the advantages of this invention are attainable in strengthening shellac that already has been subjected to the various refining treatments known in the art. An advantage of applying the present process to commercial shellac, however, is retention and control of valuable thermoplastic properties of shellac. In illustration, reference also has been made to benzol as treating agent though other treating agents may be utilized either alone or in conjunction with benzol to alter the plasticization and improve the hardness of shellac. Preferably such other treating agents comprise cyclic hydrocarbons of low boiling point, as for example toluene or xylene. A characteristic of such agents is that they cause the shellac to swell and further that they are removable to practical completeness at low temperatures to avoid undue hydrolyzation or polymerization.

This invention markedly alters shellac and places it in such condition as substantially to resist plastic flow at temperatures of 100° C. or more. Evidence of the internal or intermolecular alterations thus accomplished is found in simple hardness tests. Thus shellac washed with benzol and polymerized by heat and cured by baking in air or in a suitable gaseous atmosphere to free it from vapor or other substances which act as temporary softening agency exhibits much greater hardness at 100° C. than unwashed shellac, even when tested by pressure of a knife point or the like. More accurate are standard tests of the rate of penetration of a Vicat needle. Comparable penetrations in tests with a Vicat needle of 1 mm. rod and load of 2300 grams were at a rate of 2.3 millimeters per minute in unwashed commercial orange shellac; a rate of 6.3 millimeters per minute in commercial seed lac, but a low rate of only 0.001 millimeter per minute of each shellac after it had been treated with benzol. Even commercial "wax-free" shellacs were markedly altered by this invention. Thus in commercial "wax-free orange" shellac the test needle penetrated at a rate of 11 millimeters in 30 minutes; in "wax-free garnet" shellac at a rate of 10 millimeters in 120 minutes. But the hardness of my benzol-treated shellac slowed the rate of penetration of the test needle to only one millimeter in 16 hours. The order of magnitude of change thus indicated clearly is enormous for in general the rate is less than 0.01 millimeter/minute for this new product.

Utility for this new shellac of high strength is found in many arts. An example that emphasizes many advantages of its resistance to creep is obtained in the molding art. Thus there is important improvement in the use of shellac as a bond for mica flakes to insulate the electrically conducting segments of commutators. Commutators are built up of several hardened copper bars, or segments, bound together in cylindrical form with mica sheet insulation between the individual segments. The surface alignment between these segments should be true, to avoid undue wear and impairment of the commutator brushes. With the shellac previously used as bond for the mica, and with temperatures of the order of 100° C. and the centrifugal stresses encountered in operation, plasticity or softness of the shellac permitted displacement of the metal segments. In a series of tests at 100° C. with various high grade commercial shellacs to compare their resistance to shear stresses, a displacement of 0.36 mil. was found as average. In the same tests with the hardened shellac of the present invention, displacement was negligible. The average value was only 0.009 mil. As a consequence of importance it becomes possible in manufacture to impart to shellac bond a hardness not heretofore feasible when baking or ageing at temperatures such as 150° C., sufficiently low to avoid softening of the hard copper segments. Such seasoning serves to polymerize or set the shellac bond and make feasible under commercial conditions substantial trueness of surface or alignment of the commutator segments. Not only does this hardened shellac resist flow itself but it adheres well to the metal segments and also to the mica, and thus holds the segments in position during assemblage, during ageing and during use. Rejection of faulty commutators during assemblage is markedly reduced, and the commutator in use far better retains factory perfection. This improved shellac retains its desired thermoplastic properties during molding of the mica sheets, but when the commutator is heated thereafter this shellac exhibits many of the desired properties of a "curing" type of binder.

Although in accordance with the patent statutes I have described the principles and illustrated the applications of this invention by reference to specific examples of what I now deem to be preferred modes of operation, the invention may be practiced otherwise than as specifically described.

I claim as my invention:

1. A process for removing wax and resins from shellac comprising treating the shellac with cyclic hydrocarbon selected from the group consisting of benzol, xylene and toluene and water, the cyclic hydrocarbon extracting the impurities and the water preventing the polymerization of the shellac, and then removing the cyclic hydrocarbon and water.

2. A process for removing wax and resins from shellac comprising treating the shellac with cyclic hydrocarbon selected from the group consisting of benzol, xylene and toluene and water, the cyclic hydrocarbon extracting the impurities and the water preventing the polymerization of the shellac, and then removing the extracted impurities in the cyclic hydrocarbon and heating the shellac to evaporate the water, the heating being insufficient to effect a polymerization of the shellac.

3. A process for removing wax and resins from shellac comprising agitating the shellac and a quantity of benzol and water, the benzol extracting the wax and resins and the water preventing the polymerization of the shellac, and then removing the benzol extract and the water.

4. A process for removing impurities from shellac comprising, treating the shellac with benzol and an excess of water, the benzol extracting the wax and ether soluble resins and the water preventing the polymerization of the shellac, and then removing the benzol extract and the water.

LEON McCULLOCH.